United States Patent
Murakami

(10) Patent No.: US 7,043,067 B2
(45) Date of Patent: May 9, 2006

(54) BLACKENING PROCESSING METHOD AND APPARATUS FOR RADIATION IMAGES

(75) Inventor: Masayuki Murakami, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 615 days.

(21) Appl. No.: 10/118,040

(22) Filed: Apr. 9, 2002

(65) Prior Publication Data

US 2002/0159624 A1 Oct. 31, 2002

(30) Foreign Application Priority Data

Apr. 26, 2001 (JP) ............................. 2001-128693

(51) Int. Cl.
*G06K 9/00* (2006.01)
(52) U.S. Cl. .................. 382/132; 382/199; 250/363.04
(58) Field of Classification Search ................ 382/128, 382/130, 132, 171, 175, 176, 178, 213, 266, 382/264, 268, 274, 282, 199; 128/922; 356/39; 377/10; 250/363.04
See application file for complete search history.

(56) References Cited

U.S. PATENT DOCUMENTS

| | | | |
|---|---|---|---|
| 4,835,379 A * | 5/1989 | Carmean ............... 250/214 VT |
| 4,967,079 A | 10/1990 | Shimura | |
| 5,883,972 A | 3/1999 | Ito | |
| 6,033,091 A * | 3/2000 | Daijogo et al. ............. 362/294 |
| 6,172,770 B1 * | 1/2001 | Inoue ......................... 358/3.06 |
| 6,317,510 B1 * | 11/2001 | Murakami ................... 382/132 |
| 6,356,651 B1 * | 3/2002 | Murakami ................... 382/128 |
| 6,381,352 B1 * | 4/2002 | Nelson ........................ 382/132 |
| 6,421,469 B1 * | 7/2002 | Nelson et al. ............... 382/274 |
| 6,515,296 B1 * | 2/2003 | Komatsu et al. ........ 250/559.44 |
| 6,544,692 B1 * | 4/2003 | Takaoka et al. ............... 430/5 |
| 6,893,157 B1 * | 5/2005 | Arakawa ..................... 378/205 |
| 6,930,801 B1 * | 8/2005 | Inoue ......................... 358/3.14 |
| 2001/0012129 A1 * | 8/2001 | Inoue ......................... 358/458 |
| 2001/0046312 A1 * | 11/2001 | Murakami ................... 382/128 |
| 2002/0014403 A1 * | 2/2002 | Hoshino .................... 204/192.32 |
| 2002/0186417 A1 * | 12/2002 | Inoue ......................... 358/3.14 |
| 2004/0021761 A1 * | 2/2004 | Gaudiana et al. ........... 347/130 |

FOREIGN PATENT DOCUMENTS

| | | |
|---|---|---|
| JP | 3-98174 | 7/1991 |
| JP | 10-63831 | 3/1998 |
| JP | 10-63832 | 3/1998 |

\* cited by examiner

*Primary Examiner*—Barry Choobin
(74) *Attorney, Agent, or Firm*—Sughrue Mion, PLLC

(57) ABSTRACT

A radiation image is partitioned into a plurality of subregions. A certain subregion, which is among the plurality of the subregions, is set as a blackening region, which is to be subjected to a blackening process, or as a non-blackening region, which is not to be subjected to the blackening process. Subregions, which are adjacent to each other among the plurality of the subregions, are set alternately as a blackening region and a non-blackening region by taking the certain subregion as a reference subregion. The blackening process is performed on the subregion, which has thus been set as the blackening region.

11 Claims, 4 Drawing Sheets

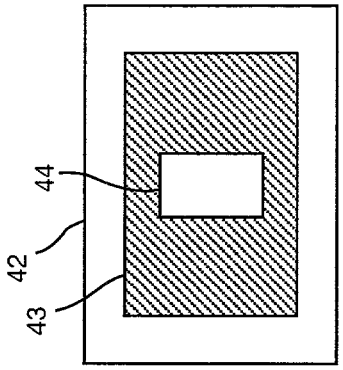

FIG.4A

BLACKENING SPECIFIED FOR REGION OUTWARD FROM BOUNDARY LINE

FIG.4B

BLACKENING SPECIFIED FOR REGION INWARD FROM BOUNDARY LINE

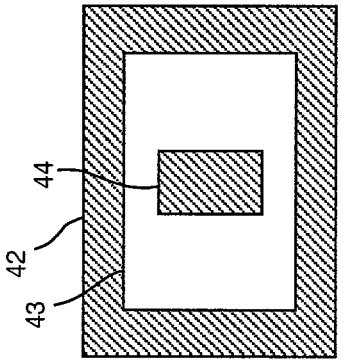

FIG.4C

BLACKENING SPECIFIED FOR REGION OUTWARD FROM BOUNDARY LINE

FIG.4D

BLACKENING SPECIFIED FOR REGION INWARD FROM BOUNDARY LINE

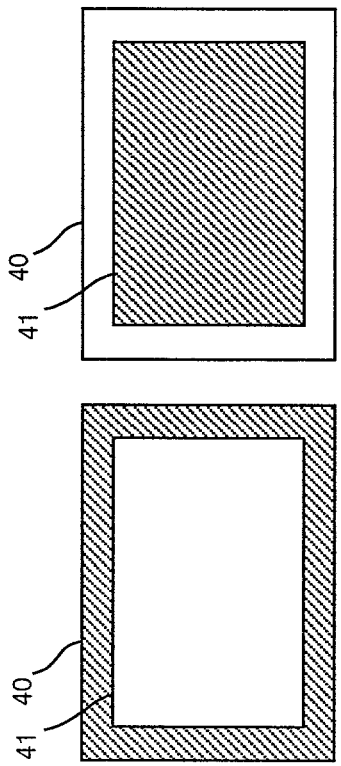

FIG.4E

BLACKENING SPECIFIED FOR REGION OUTWARD FROM BOUNDARY LINE

FIG.4F

BLACKENING SPECIFIED FOR REGION INWARD FROM BOUNDARY LINE

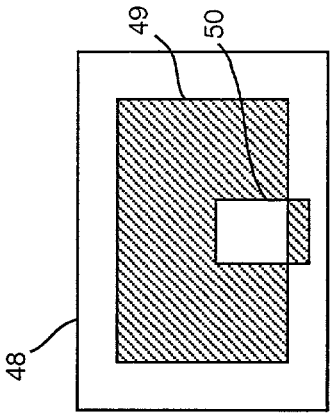

FIG.4G

BLACKENING SPECIFIED FOR REGION OUTWARD FROM BOUNDARY LINE

FIG.4H

BLACKENING SPECIFIED FOR REGION INWARD FROM BOUNDARY LINE

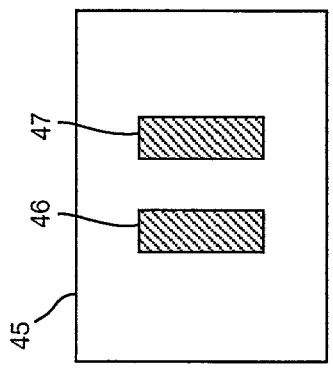
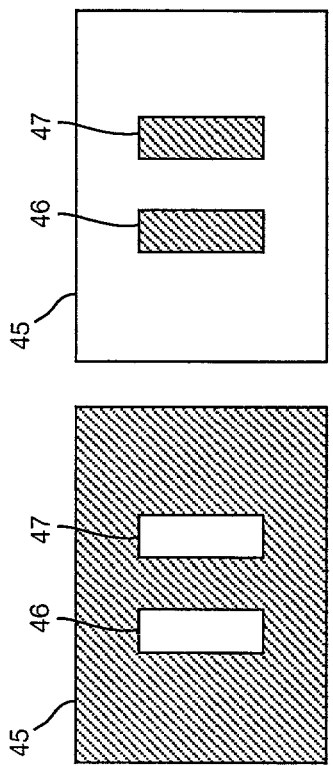

BLACKENING PROCESSING METHOD AND APPARATUS FOR RADIATION IMAGES

BACKGROUND OF THE INVENTION

1. Field of the Invention

This invention relates to a blackening processing method for a radiation image, wherein a blackening process is performed on a region of no interest, which is other than a region of interest, in a radiation image, and an apparatus for carrying out the blackening processing method for a radiation image.

2. Description of the Related Art

Techniques for reading out a recorded radiation image in order to obtain an image signal, carrying out appropriate image processing on the image signal, and then reproducing a visible image having good image quality by use of the processed image signal have heretofore been known in various fields. For example, as such techniques, the applicant proposed various radiation image recording and reproducing systems which use stimulable phosphor sheets.

When a radiation image of an object, such as a living body, is recorded on a recording medium, such as X-ray film or a stimulable phosphor sheet, it is desirable that adverse effects of radiation upon the living body can be kept as small as possible. Also, if object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, a collimation plate made from lead, or the like, is often used in order to limit the irradiation field to an area smaller than the overall recording region of the recording medium, such that the radiation may be irradiated only to that portion of the object, the image of which is to be used.

In cases where a radiation image is recorded on a recording medium, such as a stimulable phosphor sheet, by using a collimation plate, an image of an object, or the like, is recorded in a region (i.e., an irradiation field) corresponding to the region inward from the aperture contour of the collimation plate. Also, a region (i.e., a region outside of the irradiation field) corresponding to the region outward from the aperture contour of the collimation plate is not exposed to the radiation. Therefore, an irradiation field contour on the image, which contour corresponds to the aperture contour of the collimation plate, constitutes edge lines in the image.

The region outside of the irradiation field is not exposed to the radiation. Therefore, in cases where the image is a negative image recorded on medical X-ray film, the image density of the region outside of the irradiation field becomes approximately lowest on the image. By way of example, when the medical X-ray film is set on a viewing screen and the transmission image with light produced by a fluorescent lamp is seen, the region having the lowest level of image density becomes the very bright region. Therefore, in particular, the portion of the irradiation field, which portion is close to the region outside of the irradiation field, cannot be seen clearly due to dazzling effects of the bright region outside of the irradiation field. Also, in cases where an electric image signal is detected from the recording medium, on which an image has been recorded within only the irradiation field, and a visible image is reproduced from the image signal and displayed on an image displaying device, such as a cathode ray tube (CRT) display device, the region outside of the irradiation field has the highest level of luminance, and therefore the image within the irradiation field cannot be seen clearly.

Accordingly, in the radiation image recording and reproducing systems, a process for forcibly replacing the image signal values, which correspond to the region outside of the irradiation field, by image signal values representing a high level of image density (or a low level of luminance) is carried out. The process is ordinarily referred to as the blackening process. (The blackening process is described in, for example, Japanese Unexamined Patent Publication Nos. 3(1991)-98174, 10(1998)-63831, and 10(1998)-63832.)

In order for the blackening process to be performed, it is necessary that the irradiation field contour, which serves as the spatial reference for the blackening process, be set. As techniques for setting the irradiation field contour, techniques for manually setting the irradiation field contour and techniques for automatically recognizing the irradiation field contour in accordance with the image signal and setting the recognized irradiation field contour have heretofore been proposed. As the techniques for automatically recognizing the irradiation field contour, for example, techniques have been proposed, wherein an irradiation field contour is determined by utilizing the characteristics in that the irradiation field contour constitutes the edge lines in the image, at which edge lines the image density changes sharply, and finding a portion, at which the value of the image signal changes sharply. One of such techniques for determining the edge lines has been proposed in U.S. Pat. No. 4,967,079. With the technique proposed in U.S. Pat. No. 4,967,079, the edge lines are determined by (a) setting a plurality of radial straight lines, which extend from a predetermined point in the image (e.g., a center point in the image) toward ends of the image, (b) detecting an edge candidate point, at which the different in image signal value is large, from the image signal values corresponding to positions along each of the radial straight lines, a plurality of edge candidate points being thereby detected with respect to the plurality of the radial straight lines, and (c) determining the edge lines in accordance with the thus detected edge candidate points.

In cases where, for example, a protector is fitted to the site of a hip joint, or the like, of an object, and the image of the site of the object is recorded in this state, the image area corresponding to the protector within the irradiation field becomes the state close to the unexposed state. Therefore, as in the cases of the region outside of the irradiation field, the image area corresponding to the protector constitutes a very bright region within the irradiation field. In such cases, it often occurs that the image areas located around the bright image area corresponding to the protector cannot be seen clearly due to the dazzling effects of the bright image are a corresponding to the protector.

Therefore, in cases where the unexposed region due to the protector is located within the irradiation field, besides the region outside of the irradiation field, the unexposed region due to the protector also constitutes a region of no interest, which is other than the region of interest to be seen. Accordingly, it is desirable that both the region outside of the irradiation field and the unexposed region due to the protector be subjected to the blackening process, such that the region outside of the irradiation field and the unexposed region due to the protector may not adversely affect the image seeing. Also, a subdivision image recording operation is often performed, wherein the image recording region of a stimulable phosphor sheet is divided into, for example, two subdivisions which are horizontally adjacent to each other, and the image recording is performed on each of the two subdivisions by the utilization of the collimation plate. In such cases, two independent irradiation fields, which are horizontally adjacent to each other, are located within one radiation image obtained from an image read-out operation performed on the stimulable phosphor sheet. Therefore, in such cases, it is desired that the regions, which are other than the two independent irradiation fields horizontally adjacent to each other, (i.e., the regions outside of the irradiation fields) be taken as the regions of no interest and subjected to the blackening process.

Specifically, the region of no interest, which is to be subjected to the blackening process, is located in various different states within one radiation image. Heretofore, in cases where the region of no interest, which is located in various different states within one radiation image, is to be subjected to the blackening process, the problems occurred in that a complicated technique is required for specifying the region to be subjected to the blackening process, or complicated internal processing is required for eliminating an inconsistency of the technique for specifying the region to be subjected to the blackening process.

SUMMARY OF THE INVENTION

The primary object of the present invention is to provide a blackening processing method for a radiation image, wherein a desired region of no interest is capable of being subjected to a blackening process with a simple operation.

Another object of the present invention is to provide an apparatus for carrying out the blackening processing method for a radiation image.

The present invention provides a blackening processing method for a radiation image, in which a blackening process is performed on a predetermined subregion in a radiation image, the method comprising the steps of:
  i) partitioning the radiation image into a plurality of subregions,
  ii) setting a certain subregion, which is among the plurality of the subregions, as a blackening region, which is to be subjected to the blackening process, or as a non-blackening region, which is not to be subjected to the blackening process,
  iii) setting subregions, which are adjacent to each other among the plurality of the subregions, alternately as a blackening region and a non-blackening region by taking the certain subregion as a reference subregion, and
  iv) performing the blackening process on the subregion, which has thus been set as the blackening region.

The blackening processing method for a radiation image in accordance with the present invention may be modified such that a subregion, which is closest to an image end among the plurality of the subregions, is set as the certain subregion and as the blackening region.

Alternatively, the blackening processing method for a radiation image in accordance with the present invention may be modified such that, in an initial state, a subregion, which is closest to an image end among the plurality of the subregions, is set as the certain subregion and as the blackening region.

The present invention also provides a first blackening processing apparatus for a radiation image, in which a blackening process is performed on a predetermined subregion in a radiation image, the apparatus comprising:
  i) partitioning means for partitioning the radiation image into a plurality of subregions,
  ii) reference information setting means for setting reference information for setting a certain subregion, which is among the plurality of the subregions, as a blackening region, which is to be subjected to the blackening process, or as a non-blackening region, which is not to be subjected to the blackening process, and
  iii) blackening process means for:
    setting subregions, which are adjacent to each other among the plurality of the subregions, alternately as a blackening region and a non-blackening region by taking the certain subregion as a reference subregion, and
    performing the blackening process on the subregion, which has thus been set as the blackening region.

The first blackening processing apparatus for a radiation image in accordance with the present invention may be modified such that, in an initial state, a subregion, which is closest to an image end among the plurality of the subregions, is set as the certain subregion and as the blackening region.

The present invention further provides a second blackening processing apparatus for a radiation image, in which a blackening process is performed on a predetermined subregion in a radiation image, the apparatus comprising:
  i) partitioning means for partitioning the radiation image into a plurality of subregions, and
  ii) blackening process means for:
    setting a subregion, which is closest to an image end among the plurality of the subregions, as a blackening region,
    setting subregions, which are adjacent to each other among the plurality of the subregions, alternately as a blackening region and a non-blackening region by taking the subregion, which is closest to the image end among the plurality of the subregions and has been set as the blackening region, as a reference subregion, and
    performing the blackening process on the subregion, which has thus been set as the blackening region.

With the blackening processing method and apparatus for a radiation image in accordance with the present invention, the radiation image is partitioned into the plurality of the subregions. Also, the reference information for setting the certain subregion, which is among the plurality of the subregions, as the blackening region, which is to be subjected to the blackening process, or as the non-blackening region, which is not to be subjected to the blackening process, is set. In accordance with the reference information, the apparatus automatically sets the subregions, which are adjacent to each other among the plurality of the subregions, alternately as the blackening region and the non-blackening region by taking the certain subregion as the reference subregion, and performs the blackening process on the subregion, which has thus been set as the blackening region. Therefore, it is sufficient for the user to set the partitioning of the radiation image into the plurality of the subregions and the reference information, and the user is capable of simply performing the appropriate blackening process on the predetermined region without complicated operations being required.

BRIEF DESCRIPTION OF THE DRAWINGS

FIGS. 4A to 4H are explanatory views showing various patterns of setting of blackening regions.

DESCRIPTION OF THE PREFERRED EMBODIMENTS

The present invention will hereinbelow be described in further detail with reference to the accompanying drawings.

Figure 1:
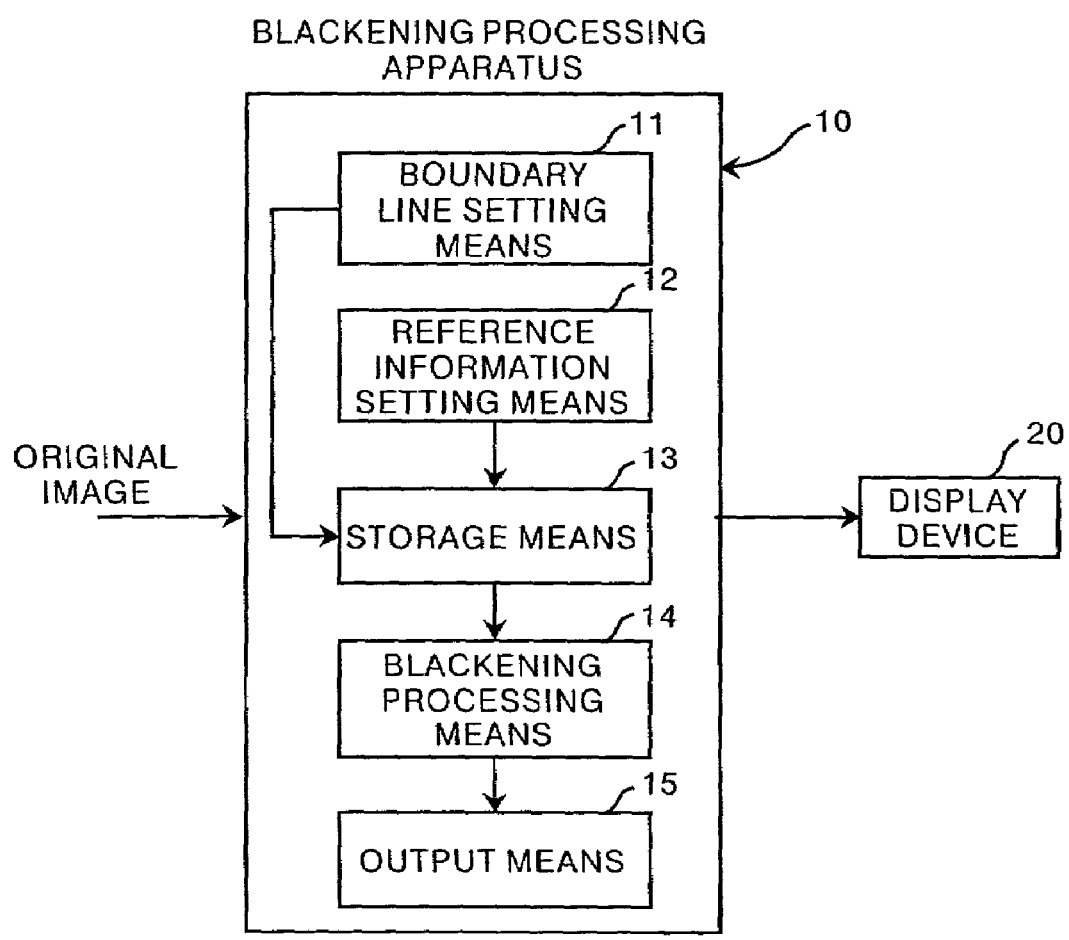
FIG. 1 is a block diagram showing an embodiment of the blackening processing apparatus in accordance with the present invention.

FIG. 1 is a block diagram showing an embodiment of the blackening processing apparatus in accordance with the present invention. With reference to FIG. 1, a blackening processing apparatus 10, which is an embodiment of the blackening processing apparatus in accordance with the present invention, comprises boundary line setting means 11 for setting boundary lines for setting regions of no interest in a radiation image. The blackening processing apparatus 10 also comprises reference information setting means 12 for setting reference information representing whether the region outward from a predetermined boundary line, which is among the boundary lines having been set by the boundary line setting means 11, or the region inward from the predetermined boundary line is to be taken as the region of no interest and subjected to a blackening process. The blackening processing apparatus 10 further comprises storage means 13 for storing the information, which represents the boundary lines having been set by the boundary line setting means 11, and the reference information, which has been set by the reference information setting means 12. The blackening processing apparatus 10 still further comprises blackening process means 14 for setting a blackening region in accordance with the boundary line information and the reference information, which have been stored in the storage means 13, and performing the blackening process on the blackening region. The blackening processing apparatus 10 also comprises output means 15 for outputting an image signal, which represents the radiation image having been subjected to the blackening process performed by the blackening process means 14. The blackening processing apparatus 10 is connected to a display device 20 for displaying the radiation image, which has been subjected to the blackening process, as a visible image.

The boundary line setting means 11 comprises input means (not shown), such as a keyboard and a mouse device, and a program comprising a procedure for setting the boundary lines for the setting of the regions of no interest in the radiation image. The reference information setting means 12 comprises the input means, which also acts as the input means of the boundary line setting means 11, and a program comprising a procedure for setting the reference information representing whether the region outward from the predetermined boundary line or the region inward from the predetermined boundary line is to be taken as the region of no interest and subjected to the blackening process. The storage means 13 may be constituted of a storage medium, such as a semiconductor memory or a hard disk. The display device 20 may be constituted of a monitor, such as a CRT display device or a liquid crystal display device.

How the embodiment of the blackening processing apparatus in accordance with the present invention operates will be described hereinbelow.

Figure 2:
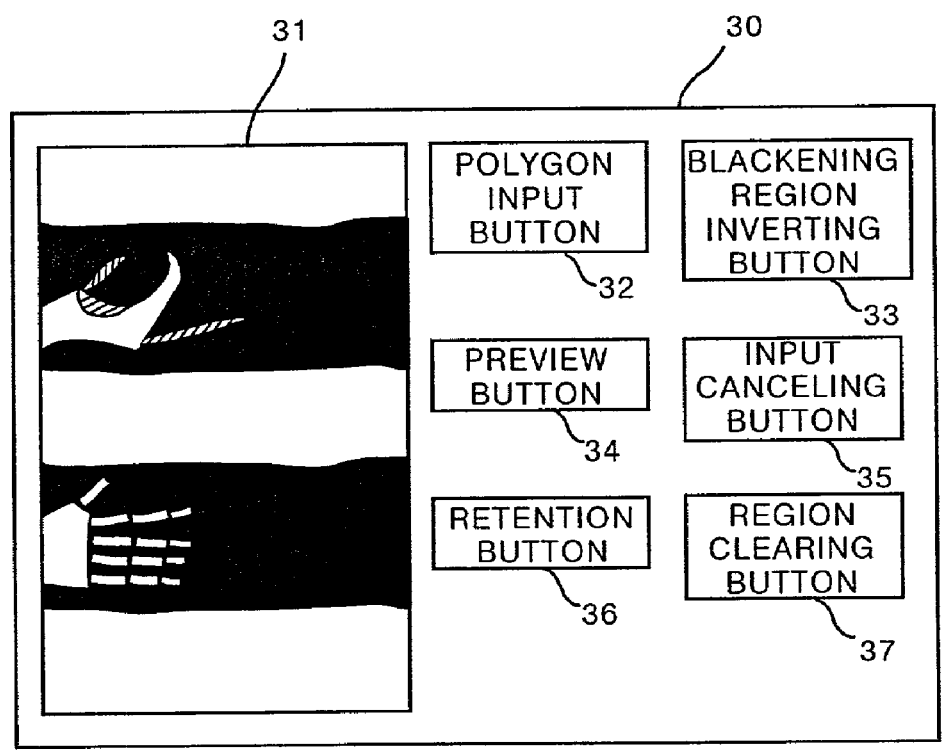
FIG. 2 is an explanatory view showing an example of a screen of the blackening processing apparatus.

The embodiment of the blackening processing apparatus in accordance with the present invention is provided with an interface screen 30 as illustrated in FIG. 2. The interface screen 30 is displayed on the display device 20. The interface screen 30 displayed on the display device 20 is provided with a radiation image displaying area 31, a polygon input button 32, a blackening region inverting button 33, a preview button 34, an input canceling button 35, a retention button 36, and a region clearing button 37. Operations on the interface screen 30 are performed by use of a mouse device (not shown), or the like.

The polygon input button 32 is the button for setting the boundary lines with the boundary line setting means 11. In cases where the polygon input button 32 is clicked, a boundary line input mode, in which the boundary lines for setting the regions of no interest are capable of being inputted with the mouse device, is set.

The blackening region inverting button 33 is the button constituting part of the reference information setting means 12. In an initial state, the reference information is set such that a region outward from the outermost boundary line is taken as the blackening region. In cases where the blackening region inverting button 33 is clicked with the mouse device, the reference information, which represents that the region outward from the outermost boundary line is to be taken as the blackening region, and the reference information, which represents that the region inward from the outermost boundary line is to be taken as the blackening region, are changed over to each other.

The preview button 34 is the button for causing the blackening process means 14 to perform the blackening process. The preview button 34 takes on the form of a concavity-convexity button. In the initial state, the preview button 34 is in the convex state (i.e., an editing state), and the boundary lines having been inputted are displayed in the radiation image displaying area 31. In cases where the preview button 34 is clicked with the mouse device, the preview button 34 is set in the concave sate (i.e., a preview state), and the blackening process is performed with respect to the region, which is among the regions having been partitioned by the boundary lines in the radiation image and which has been set as the blackening region.

In cases where the input canceling button 35 is clicked, processing for restoring to the state prior to the stage, in which the retention described below was performed, is conducted.

In cases where the retention button 36 is clicked, processing for retaining the information, which represents the currently set boundary lines, and the reference information is conducted.

In cases where the region clearing button 37 is clicked, processing for clearing all of the regions, which have previously been blackened, is conducted.

Figure 3:
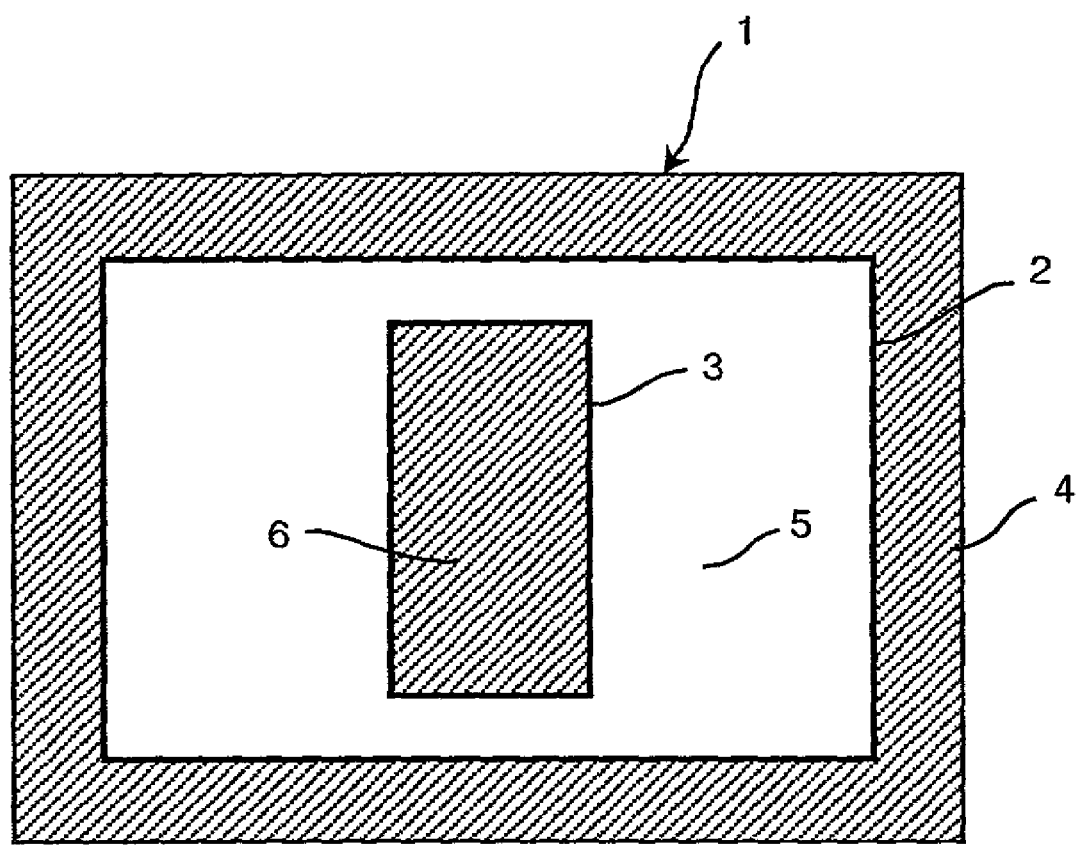
FIG. 3 is an explanatory view showing how a region of no interest is set in a radiation image.

On the interface screen 30, the user clicks the polygon input button 32 with the mouse device. Also, the user inputs the boundary lines on the image, which is displayed in the radiation image displaying area 31, with the operation of the mouse device. The information representing the inputted boundary lines is stored in the storage means 13. In this embodiment, it is assumed that, as illustrated in FIG. 3, the user sets a boundary line 2 and a boundary line 3 in a radiation image 1. Also, in this embodiment, it is assumed that the user intends to set the region outward from the outermost boundary line 2 as the blackening region and therefore does not click the blackening region inverting button 33. Therefore, the reference information is set such that the region outward from the outermost boundary line 2 is taken as the blackening region.

When the setting of the boundary lines and the reference information is finished, the user clicks the preview button 34 in order to perform the blackening process with respect to the region of no interest.

When the preview button 34 is clicked, the blackening process means 14 sets a region 4, which is outward from the outermost boundary line 2, as the blackening region in accordance with the reference information. Also, the blackening process means 14 sets a region 5, which is adjacent to the region 4, as a non-blackening region. Further, the blackening process means 14 sets a region 6, which is adjacent to the region 5, as the blackening region. Furthermore, the blackening process means 14 performs the blackening process with respect to the region 4 and the region 6, which have been set as the blackening regions. With the blackening process, image signal values corresponding to each of the blackening regions are uniformly replaced by a value corresponding to a high image density (or a low luminance).

The image signal representing the radiation image, which has been obtained from the blackening process, is outputted by the output means 15 into the display device 20 and utilized for reproducing the radiation image, which has been obtained from the blackening process, as a visible image on the display device 20.

Besides the boundary line setting pattern illustrated in FIG. 3, the boundary lines may be set in various different setting patterns. Also, in cases where the boundary line setting pattern is the same, the region subjected to the blackening process varies for the reference information, which represents that the region outward from the predetermined boundary line is to be taken as the blackening region, and the reference information, which represents that the region inward from the predetermined boundary line is to be taken as the blackening region. Several examples of the setting of the boundary lines and the reference information will be described hereinbelow with reference to FIGS. 4A to 4H.

FIGS. 4A to 4H are explanatory views showing various patterns of setting of blackening regions. It is hereinbelow assumed that the outermost boundary line in the radiation image is set as the predetermined boundary line.

In each of the examples shown in FIGS. 4A and 4B, only one boundary line 41 is set in a radiation image 40. As illustrated in FIG. 4A, in cases where the reference information is set such that the region outward from the predetermined boundary line is to be subjected to the blackening process, the boundary line 41 is taken as the predetermined boundary line, the region outward from the boundary line 41 is set as the blackening region, and the blackening process is performed with respect to the thus set blackening region. As illustrated in FIG. 4B, in cases where the reference information is set such that the region inward from the predetermined boundary line is to be subjected to the blackening process, the region inward from the boundary line 41 is set as the blackening region, and the blackening process is performed with respect to the thus set blackening region.

In each of the examples shown in FIGS. 4C and 4D, a boundary line 43 and a boundary line 44 are set in a radiation image 42, and the boundary line 44 is set in the region inward from the boundary line 43. As illustrated in FIG. 4C, in cases where the reference information is set such that the region outward from the predetermined boundary line is to be subjected to the blackening process, the outermost boundary line 43 is taken as the predetermined boundary line, the region outward from the boundary line 43 is set as the blackening region, and the region inward from the boundary line 43 is set as the non-blackening region. Also, the region inward from the boundary line 44, which region is adjacent to the region inward from the boundary line 43, is set as the blackening region. Further, the blackening process is performed with respect to the thus set blackening regions. As illustrated in FIG. 4D, in cases where the reference information is set such that the region inward from the predetermined boundary line is to be subjected to the blackening process, the blackening region and the non-blackening region are inverted, and the blackening process is performed on the region, which is inward from the boundary line 43 and outward from the boundary line 44. The example shown in FIG. 4C is identical with the example shown in FIG. 3.

In each of the examples shown in FIGS. 4E and 4F, a boundary line 46 and a boundary line 47 are set in a radiation image 45. The boundary line 46 and the boundary line 47 are spaced apart from each other so as to define two independent regions. In such cases, a boundary line, which has a point closest to the peripheral edge of the radiation image 45, is taken as the predetermined boundary line. In cases where the distance from the boundary line 46 to the peripheral edge of the radiation image 45 and the distance from the boundary line 47 to the peripheral edge of the radiation image 45 are identical with each other, either one of the boundary line 46 and the boundary line 47 may be selected as the predetermined boundary line. The selection of which boundary line is to be taken as the predetermined boundary line may be made with one of various techniques. For example, one of the boundary lines, which was set prior to the other boundary line, may be taken as the predetermined boundary line. Alternatively, one of the boundary lines, which defines an inward region having an area larger than the area of the region inward from the other boundary line, may be taken as the predetermined boundary line. In the examples shown in FIGS. 4E and 4F, it is assumed that the boundary line 46 is taken as the predetermined boundary line. As illustrated in FIG. 4E, in cases where the reference information is set such that the region outward from the predetermined boundary line is to be subjected to the blackening process, the region outward from the boundary line 46 is set as the blackening region, and the region inward from the boundary line 46 is set as the non-blackening region. Also, the region inward from the boundary line 47, which region is adjacent to the region outward from the boundary line 46, is set as the non-blackening region. Further, the blackening process is performed with respect to the thus set blackening region. As illustrated in FIG. 4F, in cases where the reference information is set such that the region inward from the predetermined boundary line is to be subjected to the blackening process, the blackening region and the non-blackening region are inverted, and the blackening process is performed on the region, which is inward from the boundary line 46, and the region, which is inward from the boundary line 47.

In each of the examples shown in FIGS. 4G and 4H, a boundary line 49 and a boundary line 50 are set in a radiation image 48. A section of the boundary line 49 and a section of the boundary line 50 intersect with each other. In such cases, a combined boundary line constituted of a section of the boundary line 49 (which section is located on the side outward from the boundary line 50) and a section of the boundary line 50 (which section is located on the side outward from the boundary line 49) is taken as the outermost boundary line, i.e. as the predetermined boundary line. As illustrated in FIG. 4G, in cases where the reference information is set such that the region outward from the predetermined boundary line is to be subjected to the blackening process, the region outward from the outermost boundary line described above is set as the blackening region, and the region inward from the outermost boundary line described above is set as the non-blackening region. Also, the region adjacent to the thus set non-blackening region, i.e. the region which is inward from the boundary line 49 and inward from the boundary line 50, is set as the blackening region. Further, the blackening process is performed with respect to the thus set blackening regions. As illustrated in FIG. 4H, in cases where the reference information is set such that the region inward from the predetermined boundary line is to be subjected to the blackening process, the blackening region and the non-blackening region are inverted, and the blackening process is performed on the region, which is inward from the boundary line 49 and outward from the boundary line 50, and the region, which is outward from the boundary line 49 and inward from the boundary line 50.

With the aforesaid embodiment of the blackening processing apparatus in accordance with the present invention, in accordance with the boundary line for setting the region of no interest and the reference information, which represents whether the region outward from the boundary line or the region inward from the boundary line is to be subjected to the blackening process, the blackening processing apparatus automatically sets the regions, which have been partitioned from each other by the boundary line and are adjacent to each other, alternately as the blackening region and the non-blackening region. Also, the blackening processing apparatus performs the blackening process on the region, which has thus been set as the blackening region. Therefore, it is sufficient for the user to set the boundary line and the reference information, and the user is capable of simply performing the appropriate blackening process on the region of no interest without complicated operations being required.

In the embodiment described above, reference information setting means 12 takes the outermost boundary line as the predetermined boundary line. Alternatively, the predetermined boundary line may be specified arbitrarily by the user. Also, in the embodiment described above, in the initial state, the region outward from the outermost boundary line is taken as the blackening region. However, the initial state may be set in one of various other ways.

Further, the interface screen is not limited to the interface screen 30 shown in FIG. 2 and may be one of various other interface screens, with which the blackening processing method and apparatus for a radiation image in accordance with the present invention are capable of being embodied.

What is claimed is:

1. A blackening processing method for a radiation image, in which a blackening process is performed on a predetermined subregion in a radiation image, the method comprising the steps of:
   i) partitioning the radiation image into a plurality of subregions,
   ii) setting a certain subregion, which is among the plurality of the subregions, as a blackening region, which is to be subjected to the blackening process, or as a non-blackening region, which is not to be subjected to the blackening process,
   iii) setting subregions, which are adjacent to each other among the plurality of the subregions, alternately as a blackening region and a non-blackening region by taking the certain subregion as a reference subregion, and
   iv) performing the blackening process on the subregion, which has thus been set as the blackening region.

2. A method as defined in claim 1 wherein a subregion, which is closest to an image end among the plurality of the subregions, is set as the certain subregion and as the blackening region.

3. A method as defined in claim 1 wherein, in an initial state, a subregion, which is closest to an image end among the plurality of the subregions, is set as the certain subregion and as the blackening region.

4. A blackening processing apparatus for a radiation image, in which a blackening process is performed on a predetermined subregion in a radiation image, the apparatus comprising:
   i) partitioning means for partitioning the radiation image into a plurality of subregions,
   ii) reference information setting means for setting reference information for setting a certain subregion, which is among the plurality of the subregions, as a blackening region, which is to be subjected to the blackening process, or as a non-blackening region, which is not to be subjected to the blackening process, and
   iii) blackening process means for:
      setting subregions, which are adjacent to each other among the plurality of the subregions, alternately as a blackening region and a non-blackening region by taking the certain subregion as a reference subregion, and
      performing the blackening process on the subregion, which has thus been set as the blackening region.

5. An apparatus as defined in claim 4 wherein, in an initial state, a subregion, which is closest to an image end among the plurality of the subregions, is set as the certain subregion and as the blackening region.

6. A blackening processing apparatus for a radiation image, in which a blackening process is performed on a predetermined subregion in a radiation image, the apparatus comprising:
   i) partitioning means for partitioning the radiation image into a plurality of subregions, and
   ii) blackening process means for:
   setting a subregion, which is closest to an image end among the plurality of the subregions, as a blackening region,
   setting subregions, which are adjacent to each other among the plurality of the subregions, alternately as a blackening region and a non-blackening region by taking the subregion, which is closest to the image end among the plurality of the subregions and has been set as the blackening region, as a reference subregion, and
   performing the blackening process on the subregion, which has thus been set as the blackening region.

7. A method as defined in claim 1, wherein the radiation image is manually partitioned into a plurality of subregions.

8. A method as defined in claim 1, wherein each of the plurality of subregions are polygonal.

9. A method as defined in claim 1, wherein the plurality of subregions comprises a first subregion, a second subregion, and a third subregion, the second subregion is at least partially enclosed by the first subregion, and the third subregion is at least partially enclosed by the second subregion.

10. A method as defined in claim 9, wherein each of the first, the second, and the third subregions are alternatingly set between a blackening region and a non-blackening region.

11. An apparatus as defined in claim 4, wherein each of the plurality of subregions are polygonal.

* * * * *